March 6, 1928.
C. I. ROBERTS ET AL
1,661,305
SUBSOIL CULTIVATOR
Filed Sept. 1, 1926
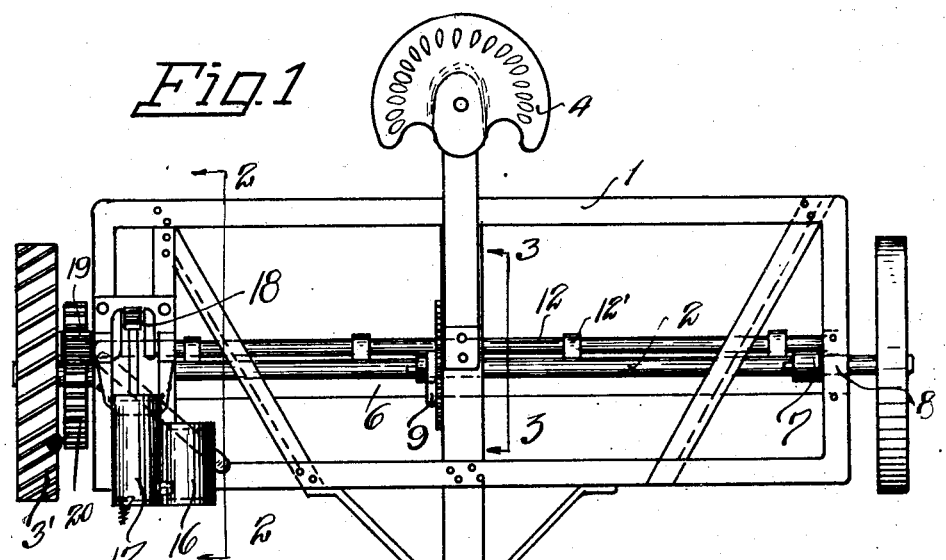
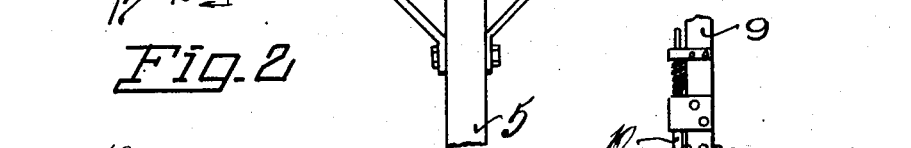
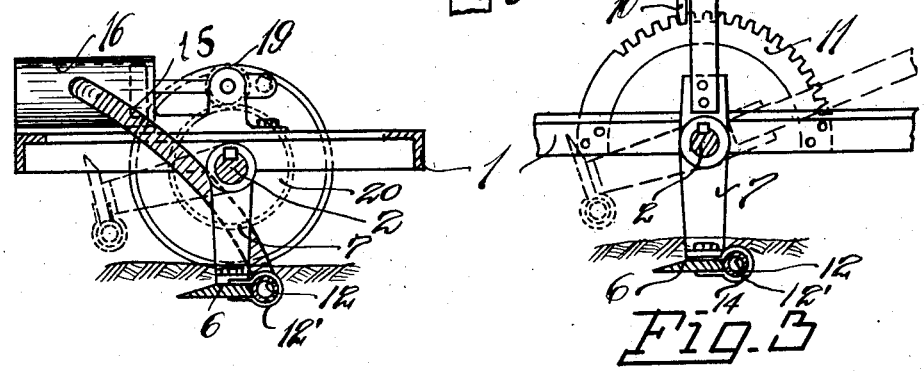
Inventor
Clem I. Roberts
Ben F. Collier
By Herbert E. Smith
Attorney Patented Mar. 6, 1928.

1,661,305

UNITED STATES PATENT OFFICE.

CLEMENT I. ROBERTS AND BENJAMIN F. COLLIER, OF ALBION, WASHINGTON; SAID COLLIER ASSIGNOR OF ONE-EIGHTH TO THOMAS A. COLLIER, OF ROCKFORD, WASHINGTON, AND ONE-EIGHTH TO JAMES F. COLLIER, OF SPOKANE, WASHINGTON.

SUBSOIL CULTIVATOR.

Application filed September 1, 1926. Serial No. 132,944.

Our invention relates to an improved subsoil cultivator or wheeled implement by means of which materials in either gaseous or liquid form, may be introduced to the soil beneath its surface for enriching and enhancing the value of the soil for farming purposes. The implement embodies in its construction the well known type of mulching cultivator or sub-soil weeder, which is equipped with means for distributing the fertilizer or other materials over areas beneath the soil, in a thorough and rapid manner.

The invention consists in certain novel combinations and arrangements of parts for the provision of a compactly arranged implement of this character, which is efficient in the performance of its functions and which may be controlled with facility.
In the accompanying drawings we have illustrated one complete example of the physical embodiment of our invention wherein the parts are combined and arranged according to the best mode we have thus far devised for the practical application of the principles of our invention.

Figure 1 is a plan view of a horse drawn implement embodying our invention.

Figure 2 is a vertical sectional detail view at line 2—2 of Figure 1.

Figure 3 is a vertical sectional detail view at line 3—3 of Figure 1.

In carrying out our invention we use a horse drawn implement having a main frame 1 of rectangular shape supported on the axle 2, and the traction wheels 3 and 3' are journaled at the ends of the axle in usual manner to revolve thereon. A seat 4 is mounted above the main frame for the driver, and a team of horses are attached or hitched to the implement at the sides of the forwardly extending draft tongue 5, which is braced in suitable manner, as are also the parts of the main frame.
The cutter blade 6, shown by full lines in operative position in Figures 2 and 3, extends transversely of the implement, parallel with the axle and is located, when in operative position, directly beneath the axle, in such position as to penetrate and pass through the soil beneath its surface for mulching and cultivating the soil, as the implement is drawn along the surface of the soil. The cutting blade is suspended from the axle by means of a pair of hangers or side arms 7, 7, having hubs keyed on the axle, which latter is supported in bearings 8, from the under side of the main frame 1.

By means of a lever 9, fixed to the axle, and ratchet 10 carried by the lever, and coacting with the arcuate rack plate 11 fixed to the main frame, the blade may be swung on the axle as a pivot to inoperative position as indicated in dotted lines Figs. 2 and 3, when not needed for use.
At the rear of the transversely disposed cutting blade 6 is carried a parallel tubular casing or distributer pipe 12, fixed to the blade by means of clamp brackets 12' and closed at one end by means of a cap. Perforations or openings 14 are arranged at the rear side of the distributer pipe and extend throughout the length of the pipe. By means of a flexible pipe or tube 15, the distributer pipe is connected to a tank or reservoir 16 which contains gas or liquid under pressure to be introduced through the flexible connection to the distributer pipe and ejected out from the pipe through the openings therein.
The material to be injected into the soil may be placed under pressure within the tank or reservoir 16 in suitable manner, as by the use of a pump 17, which in this instance is operated through its crank connection 18 from a pinion 19 that meshes with a gear 20 rotatable with the traction wheel 3'. Thus as the implement is drawn over the surface of the soil with the cutting blade and distributer traveling below the surface, the soil is mulched by the blade and the fertilizer or other material is forced under pressure through the perforations of the distributer and injected into the mulched soil.

By utilizing the lever 9 to swing the cutting blade and distributer to the inoperative dotted line positions, the implement may be drawn to its place of use and the pump may be used during this time to provide pressure for blowing air through the distributer for cleaning out the orifices or perforations 14 of the distributer.

Having thus fully described our invention, what we claim as new and desire to secure by Letters Patent is:
In a cultivator the combination with a main frame, supporting shaft and traction wheels, of a transversely extending sub-soil cutter blade, side arms rigidly secured to the blade and to said supporting axle, a ratchet lever rigid with the shaft and an arcuate rack plate fixed on the frame for co-action with the ratchet lever whereby the cutter blade may be rigidly maintained in operative position with its side arms disposed in a vertical plane, or rocked to adjusted position by means of the lever.

In testimony whereof we affix our signatures.

CLEMENT I. ROBERTS.
BENJAMIN F. COLLIER.